(12) United States Patent
Hänggi

(10) Patent No.: US 10,157,533 B2
(45) Date of Patent: Dec. 18, 2018

(54) TRACKING DEVICE AND A SYSTEM FOR FINDING OBJECTS

(71) Applicant: Daniel Hänggi, Zug (CH)

(72) Inventor: Daniel Hänggi, Zug (CH)

(73) Assignee: Daniel Hänggi, Zug (CH)

( * ) Notice: Subject to any disclaimer, the term of this patent is extended or adjusted under 35 U.S.C. 154(b) by 0 days.

(21) Appl. No.: 15/098,345

(22) Filed: Apr. 14, 2016

(65) Prior Publication Data

US 2016/0307433 A1    Oct. 20, 2016

(30) Foreign Application Priority Data

Apr. 14, 2015  (CH) ..................................... 00520/15
Oct. 25, 2015  (CH) ..................................... 01555/15

(51) Int. Cl.
| | |
|---|---|
| H04M 3/00 | (2006.01) |
| G08B 21/24 | (2006.01) |
| H04W 52/02 | (2009.01) |
| G08C 17/02 | (2006.01) |
| G08B 21/02 | (2006.01) |

(52) U.S. Cl.
CPC .......... *G08B 21/24* (2013.01); *G08B 21/023* (2013.01); *G08B 21/0269* (2013.01); *G08B 21/0272* (2013.01); *G08C 17/02* (2013.01); *H04W 52/0235* (2013.01); *G08C 2201/12* (2013.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/22* (2018.01)

(58) Field of Classification Search
USPC ......................................................... 455/420
See application file for complete search history.

(56) References Cited

FOREIGN PATENT DOCUMENTS

| WO | 2010022408 A1 | 2/2010 |
| WO | 2011/161194 A1 | 12/2011 |

OTHER PUBLICATIONS

WO2011/161194 A1 translation—Machine Translation of Document supplied by the Applicant—see IDS dated Feb. 8, 2017.*
Meister, "Partial European Search Report", dated Oct. 12, 2016.

* cited by examiner

*Primary Examiner* — Charles Shedrick
(74) *Attorney, Agent, or Firm* — Justin W. McCabe; Dunkiel Saunders Elliott Raubvogel & Hand, PLLC

(57) ABSTRACT

Embodiments of a tracking device featuring a housing, which preferably is closed, waterproof, perhaps made from a synthetic material, and free of pressure switches or other man-machine interface, unless rudimentary at best, are disclosed. Typically, the tracking device comprises attachment means for its attachment to the object, which are suited to the object type. At best, its external shape is adapted to that of the object in such a way that the tracking device hardly vibrates or rattles during transport of the object. By virtue of its shape or by virtue of its attachment means, it is suitable for durable attachment to its object. Ideally, a tracking device measures only a few centimeters, or is even smaller. It should be suitable for being hidden in the object or for being separable therefrom only with difficulty. For such reasons alone, tracking devices differ from mobile telephones and the like.

12 Claims, 8 Drawing Sheets

TRACKING DEVICE AND A SYSTEM FOR FINDING OBJECTS

RELATED APPLICATIONS

This application claims priority to Switzerland Application No. 00520/15, filed on Apr. 14, 2015 and titled "Markierungsgerät und ein System zum Auffinden von Gegenständen" and Switzerland Application No. 01555/15, filed on Oct. 10, 2015 and titled "Markierungsgerät und ein System zum Auffinden von Gegenständen", each of which are incorporated herein in their entirety.

FIELD OF THE INVENTION

The present invention generally relates to tracking systems. In particular, the present invention is directed to A Tracking Device and System for Finding Objects.

BACKGROUND

A tracking device is intended to facilitate finding an object to which it is attached by sending tracking messages. These messages by definition are tracking messages on the basis of their origin, even if they are being forwarded by a data processing device, possibly after translation by the data processing device for a different transmission technology.

Known tracking devices which use short-range radio technology enable a mobile data processing device, for example a mobile telephone, to check its connection with them often. An alarm is generated if an object with a tracking device is being distanced from the mobile telephone in other words, if a durable connection to the attending mobile telephone is lost. These tracking devices do not require a motion detector. In most cases, their wireless communication module is not capable of receiving messages. The tracking devices and the mobile telephone constitute a small system for not losing objects. The mobile telephones do not constitute a community. Even though they can communicate with each other via the mobile telephone communication network, they cannot, for lack of a suitable application program, communicate with the short-range wireless communication modules of the other mobile phones are the very wireless communication modules that can receive tracking messages. If the mobile telephone rather than the tracking device raises the alarm, it might inquire from the object owner as to whether the object is lost, depending on the specific purpose of the alarm.

U.S. Pat. No. 7,098,786 describes such a tracking device that can receive messages. Upon instruction by the mobile telephone, it can increase or decrease the mean power over time of the wireless communication module by increasing, or respectively decreasing the mean sending power over the course of a tracking message. Thus, the approximate distance between object and mobile telephone at which an alarm is triggered is being adapted to the circumstances.

A loss-prevention tracking device according to the pre-characterizing parts of claim 1 and claim 10 is known from U.S. Pat. No. 7,664,463. It switches on its wireless communication module in consequence of a signal from its motion detector, or after a predetermined period. The wireless communication module then sends messages according to the Bluetooth standard and observes whether it obtains an answer with an identification of a data processing device that is allocated to it. Failing such an answer, it attempts at once to focus attention on itself by raising an alert, for instance by means of a loudspeaker. If it does obtain this answer, it switches the wireless communication module off again so as to preserve its electrical power source.

One can integrate a tracking device into a system for finding objects. U.S. Pat. No. 2010/00,164,715 discloses such systems, as well as a tracking device version that includes an acceleration sensor and that can post a burglary notice to a data processing device of the object owner. The tracking devices of the localization systems described therein can be reached using short-range radio technology thanks to a community of associated mobile telephones or the like, and, optionally, additionally associated stationary wireless communication installations. One of them, for instance, can notify the system computer that a tracking device has left its proximity or that it has arrived therein, optionally adding a statement on its position as found by trilateration. The system computer can present the owner with a loss inquiry by making his associated mobile telephone raise an alarm or instead with an end-of-loss notice, and optionally with a position statement, too. The power of sending and receiving short-range radio messages by the tracking devices is pre-set in accordance with the required proximity range. No tracking device adapts its wireless communication module power or other power to the circumstances in operation, in particular to whether a loss is to be assumed. Accordingly, the system computer does not post a no-loss notice to the tracking devices, nor anything else.

Finding objects necessitates communicating wirelessly with the tracking devices often. A thief might discover and remove or disable the tracking device quickly, necessitating a quick alarm response. At the typical sending rates, even short-range communication according to an energy-saving protocol quickly exhausts batteries that are customary in trade, as well as the capacity of the radio channels in the case of an aggregation of system participants.

The object of the present invention is overcoming such problems.

SUMMARY OF THE DISCLOSURE

The invention at hand enables simple and cost-efficient object marking. It uses available mobile radio networks, which offer very good spatial coverage in many countries already today, in particular in densely populated cities and agglomeration areas. Many mobile telephone users have a flat-rate contract for mobile data traffic with their telephone service provider, by which the problem of additional costs fades into the background.

A tracking device features a housing, which preferably is closed, waterproof, perhaps made from a synthetic material, and free of pressure switches or other man-machine interface, unless rudimentary at best. Typically, a tracking device comprises attachment means for its attachment to the object, which are suited to the object type. At best, its external shape is adapted to that of the object in such a way that the tracking device hardly vibrates or rattles during transport of the object. By virtue of its shape or by virtue of its attachment means, it is suitable for durable attachment to its object. Ideally, a tracking device measures only a few centimeters, or is even smaller. It should be suitable for being hidden in the object or for being separable therefrom only with difficulty. For such reasons alone, tracking devices differ from mobile telephones and the like.

Optimally, a tracking device can only be separated from the object without damaging the object thanks to a special tool that cannot be obtained freely in the marketplace or that cannot be used afield. Ideally, it should remain functional after exposure to casual force and should, by way of example, be able to survive a few blows with a hammer.

The electronic components of a tracking device, if not all integrated into an application specific integrated circuit, or ASIC, typically include either a separate microcomputer or a separate programmable logic controller, also called PLC. Preferably, the tracking device features a timer.

A tracking device comprises its own electrical power source, typically a battery. Alternatively or additionally, in particular if it should be recharged quickly now and then, an electrochemical condenser, often called supercapacitor, might come under consideration. Preferably, a tracking device additionally would comprise a photovoltaic cell or another autarkic energy source using ambient light or movement. At least in that way, a tracking device differs from passive transponders, such as so-called RFID tags that feed on the energy of an inquiring radio signal in order to be able to send the reply.

It is capable of autonomously causing its radio module or suchlike wireless communication module to send a tracking message or to listen for messages. In other words, it is capable of causing the wireless communication module to send a tracking message which is not in consequence of the receipt of a message with an instruction thereto, even if it may also be capable of doing so upon instruction when it does listen. At least in that way, a tracking device differs from active transponders, such as aircraft radio transponders.

The invention concerns a tracking device according to the pre-characterizing part of claim 1 or the pre-characterizing part of claim 10, as well as a system according to the pre-characterizing part of claim 13.

Such a tracking device features at least an electrical power source, a processor, a memory and a bidirectional wireless communication module. It might comprise a motion detector and is capable, by design and most likely by programming, at least of temporarily increasing or decreasing the mean power over time of the wireless communication module.

Without switching on the wireless communication module, a tracking device would consume power of around 0.01 mW for performing simple functions. So, without regard to self-discharge, a small battery that is customary in trade would last up to some 20 years. A module for bidirectional wireless short-range communication typically requires an additional 0.01 mW merely for receiving messages if the module is awake in frequent but brief time slots, which are prolonged if it hears wireless traffic in an attempt at least to determine a message address and possibly to synchronize the time slots with predetermined repeat messages. However, this power value can be significantly higher, dependent on the way in which signals are being mixed or otherwise processed. Furthermore, sending tracking messages briefly demands a burst of power, typically around 100 mW during 10 mS. At a high sending rate of typically around once per 1 S, this corresponds with an average power of 1 mW. Therefore, the said battery would not even last a quarter year in sustained sending mode. Additionally, non-negligible power is required for other calculation and, if applicable, for operating the motion detector and for the assessment of the signal thereof, in short the motion signal. Depending on the nature of the motion detector and the application program, this power temporarily may exceed that of the activated wireless communication module. However, it is important that the electrical power source of a tracking device is capable of an autonomous operation for more than a quarter year. Incidentally, mobile telephones should not be considered tracking devices for this reason as well.

A system for finding objects according to the pre-characterizing part of claim 13 comprises, in addition to tracking devices, at least a system computer with at least a processor and a memory. The system computer might include a server and might even be in the cloud. It is capable of communicating via a communication network with wireless communication modules thereof that are capable of receiving tracking messages or capable of sending messages for the wireless communication module of a tracking device. To each object, at least one tracking device is attached. The system computer is capable of maintaining in its memory a list of the objects, in each case at least with a statement on the applicant thereof, on how to communicate with its data processing devices, and of any loss of the object. The system computer is also capable of performing an identification of the tracking device on the basis of at least a delivered tracking message. It is also capable of dispatching a message from it, in other words, a system message with a loss inquiry or capable of dispatching a system message with an at-rest inquiry to a data processing device of the applicant.

By virtue of the invention, tracking devices and other restrained system components can reduce firing up their wireless communication module, occupying communication channels and keeping each other busy.

The tracking device according to the characterizing features of claim 1 is capable of increasing or decreasing the mean power of the wireless communication module over time in consequence of a transport supposition on the basis of an assessment of at least the motion signal.

A supposition by the tracking device that it is being transported is based on an intelligent assessment by the processor in order to exclude frequent other movement in normal other use. Toppling or replacing a bicycle that is provided with a tracking device should not trigger a particular course of action. The size of the perceived movement, possibly together with other factors, is decisive. Movements under a minimal distance should be ignored, for example, less than 10M for a bicycle at home or less than 5M for a leather coat in a restaurant cloakroom, or less than 100M for cars in the parking lot of a repair shop. The tracking device supposes that the object has been transported if the movement as calculated from the motion signal exceeds a threshold distance that has been set to exclude typical object movements for other reasons.

The motion detector advantageously features an acceleration sensor. Simple acceleration sensors are produced cost-effectively from piezoelectric materials or as a component of a micro-electro-mechanical system, also called MEMS. Thanks to their low-energy operation, they can be used virtually permanently, which is important for tracking devices.

Preferably, the motion detector comprises an angular acceleration sensor, by way of example in the same MEMS, or an angular rate sensor, or a compass. These allow a much more accurate estimation of the transport distance and, possibly enhanced by further data, even a position estimation.

Without any such sensor for calculating orientation, the absolute acceleration can still be computed efficiently with a compensation for gravity. One way, of course, is to subtract gravity from the root of the sum of the square of the acceleration values in the three sensed directions, or better yet from some approximation of that function, although the detector response then depends on sensor orientation. However, calculating a directional acceleration over some time only makes sense if the sensor can be assumed not to rotate by much, so that gravity and object movement essentially work in constant, mutually perpendicular directions. An example is someone riding away on a bicycle to which the tracking device is fixed. Fortunately, the plausibility of this assumption can be checked by using the measurement results themselves, particularly if gravity is much stronger than the typical added acceleration peaks, or by considering properties of the object to which the tracking device is attached. The tracking device, advantageously, is capable of estimating the distance over which it is transported by double integration of the acceleration over time. The term integration over time also means adding up acceleration values that are each measured in a period after multiplication with the duration of that period. Preferably, the processor is capable of determining a transport supposition at least by double integration of the acceleration over time or, if it has been subjected to prolonged acceleration recently, on the basis of the rate of occurrence and the nature of the accelerations.

Advantageously, the processor is capable of determining a transport supposition on the basis of the rate of occurrence and the nature of accelerations at least by determining whether an acceleration that exceeds an acceleration threshold, for instance $0.3 M/S^2$ in or opposite to one sensed direction or $1.5 M/S^2$ absolutely, or a sequence of such accelerations that follow each other within an interval threshold, say 0.8 S, exceeds a duration threshold, say 5 S.

Such accelerations typically occur when a vehicle is being accelerated from standstill in regular traffic on the open road, but also when someone is walking 10 meters at a steady pace. They differ from the usual acceleration without transport, for example, when replacing an object over a smaller distance or reworking it in one spot. The acceleration threshold has been chosen well below the typical torso acceleration when walking steadily, which is around 3 meter/second$^2$ ($M/S^2$) sideways and vertically. Peak levels for walking are around $5M/S^2$. An acceleration sensor attached to a bicycle that is being driven or escorted on foot typically would yield less, but within the same order of magnitude. The interval threshold of 0.8 S normally includes a car changing gears, or someone walking upstairs slowly.

Discounting accelerations that come and go within a second duration threshold, say 0.1 S, filters out any vibration or soundwave impact within the sensor sensitivity, as well as most shocks. Raising the acceleration threshold might help too.

In certain circumstances, even a temperature sensor in combination with an intelligent assessment by the processor is to be regarded as part of a motion detector of a tracking device. Depending on season, place and application, a temperature drop or rather a jump in temperature, for example by more than 1.5° C. within 20 S, reliably indicates departure from a building or the like if it follows an acceleration or sequence of accelerations that is as described above but lasts for more than 3 S only.

Less advantageous in the sense of cost-efficiency, but of course ideal for establishing a precise location, is a module that can determine its position with the satellite supported global positioning system, also called GPS. Under open skies, the GPS module can detect movement by taking the difference of its measurements. The processor can suppose that a transport occurs at least if a measured position differs from a measured position in which the object can be assumed to have been at rest by more than a threshold distance.

A further example of a motion detector is a wireless communication module that can receive messages from wireless communication modules of wireless network communication installations, together with a program for the processor to assess suitable statements in the messages. The identity of the stationary wireless network communication installations alone allows drafting an inaccurate movement notice. For this, the processor now and then switches on the wireless communication module and finds out whether it receives messages from the same wireless network communication installations as before. If some or all of these are absent, or if messages from other wireless network communication installations are also included, the processor, by use of an algorithm, can infer movement or even a transport supposition. The same holds true if the messages contain a statement on the position of the wireless network communication installation instead of its identity.

This analysis, however, might be too imprecise and therefore too slow to prevent a thief at an intermediate distance from searching the object and removing the tracking device before it increases the mean power of the wireless communication module to send tracking messages with a transportation notice and a loss inquiry. Multilateration is more precise but does require more processor power, too.

By multilateration, thanks to comparing signal strengths or, with more precision, signal runtimes, the processor can calculate its relative position and its movement from any difference over time. If the system messages also contain statements on the position of the installations, the processor, by multilateration, can even calculate its absolute position. However, because of the required processing power, multilateration is best done by sensors and a computer of the wireless network communication installations. As immobile sensors have a known orientation, they might additionally or alternatively allow for multiangulation. The computer would then dispatch statements on the position of the tracking device, be it relative to the wireless network communication installations or absolute.

Therefore, the tracking device advantageously is capable of determining a transport supposition on the basis of an assessment of at least suitable statements in the messages from wireless communication modules of wireless network communication installations, such as statements on their position, more efficiently statements on their identity, more accurately statements on the message sending time, or, more accurately yet efficiently statements on its position.

Furthermore, the tracking device according to the invention might be capable of decreasing the increased mean power over time of the wireless communication module in consequence of an end-of-transport supposition on the basis of an assessment of at least the motion signal. Advantageously, the tracking device is capable thereof on the basis of the receipt of a system message with the notice that its position is known.

The tracking device according to the characterizing features of claim 10 is capable of increasing or decreasing the mean power over time of the wireless communication module on the basis of an assessment of at least the mean rate of occurrence of wireless communication modules from which its wireless communication module detects messages.

By definition, the detection of messages by a wireless communication module is the detection of their existence and may or may not include their receipt, the latter indicating its ability to process them.

This is particularly useful when the tracking device is to be found in a forest, in the mountains, on open water or in another area in which a communication partner is only rarely within reach. Something similar applies if the object is deposited in a cellar. Alternatively, a tracking device can suppose its isolation on the basis of a position statement from its GPS module or on the basis of the receipt of a message with a position statement. For example, it obtains such a position statement during transportation with an annotation from the sender, either a mobile data processing device with a GPS module or a wireless network communication installation that it is located in such an area. The position of the tracking device can be appraised in particular by radio signal runtime measurement regarding several wireless network communication installations, much like a GPS module measures the runtime of radio signals from satellites with known positions.

A variant of the tracking device that comprises a radiation sensor is capable of increasing or decreasing the mean power over time of the wireless communication module on the basis of an assessment of at least the radiation signal regarding the diurnal cycle or regarding quicker intensity changes. Both allow a determination of an isolation supposition of the tracking device.

A radiation sensor can be produced cost-effectively as a diode with suitable doping in semiconductor material. Advantageously, the radiation sensor is sensitive for electromagnetic radiation in a visible or infrared range. The processor can, for example, by Fourier analysis, detect the strength of the diurnal cycle from the signal thereof. If absent or hardly present, the object is likely stationed in a dark room, and the tracking device is likely to be isolated from potential communication partners. Likewise, the processor can infer urban surroundings from a short darkness period in the diurnal cycle or from numerous second-by-second fluctuations of the radiation intensity, as well as infer the vicinity of a television apparatus from a flickering. An absence of these indicators hints at an isolation supposition.

Preferably, the tracking device according to the invention comprises an acoustic sensor. The assessment of the acoustic signal, even if only of the strength of noise, can also cause or support an isolation supposition.

Particularly advantageous for dealing with isolation, the tracking device according to the invention is capable of increasing or decreasing the mean power over time of the wireless communication module by increasing, or respectively decreasing the mean sending power over the course of a tracking message. Preferably, a tracking device also is capable of increasing or decreasing the mean rate of occurrence of tracking messages, for example, from once every 3600 S to once every 60 S. Advantageously, the tracking device increases, or respectively decreases the mean rate of occurrence of the tracking messages at least by a factor 5.

According to the invention, absent a particular suspicion that the object is lost, a tracking message for the purpose of optimising energy consumption is sent only rarely, by way of example once every 10800 S. However, if the tracking device supposes that it is being transported or that it is in a position of isolation, or under other circumstances, it advantageously leaves the wireless communication module switched on permanently or briefly but at least once per minimum duration of a system message, so as to be able always to receive a system message that is in reach or to detect one and receive the prescribed repetition thereof, optionally until a system message with a no-loss notice arrives. Preferably, the tracking device is capable of decreasing the mean power over time of the wireless communication module by temporarily ending the capability of the wireless communication module to receive messages following a period after sending a tracking message.

Although the tracking device according to the invention increases the rate of occurrence of the tracking messages, if a transport supposition exists in addition to an isolation supposition, it best does so to a lesser extent than otherwise for preserving the electrical power source.

Advantageously, the wireless communication module is capable, in consequence of a transport supposition or an isolation supposition, of sending tracking messages with a transport or with a position statement, respectively with a position statement.

In certain embodiments of the invention, the tracking device is capable of maintaining a list of mobile or non-mobile data processing devices in the memory. An application program is available for this. In execution of the application program, the processor writes identity data of certain data processing devices, such as a universally unique identifier, in short UUID, or a similar identification number of a participant identification module, commonly called subscriber identity module or SIM, into the memory. About the person to whom the data processing device is allocated in the list, the processor might add his identity, his relation to the object owner or other relevant statements. This person is, for example, the applicant of the object to which the tracking device is attached, a person who was authorized by the applicant to transport the object, a person who was explicitly not authorized by the applicant, or a person who was authorized only in an appointed area, in an appointed period, or otherwise within limits.

It may happen that the tracking device is attended by a data processing device that is separately accredited or that is embedded in an encompassing system. For example, the mobile telephone of the applicant remains constantly in the vicinity of the object. Even if no suitable application program is active in the mobile telephone for being able to communicate with the tracking device, the tracking device can reduce the power of its wireless communication module simply by recognizing the identity of the mobile telephone. Something similar applies if, for a while, the tracking device detects or, if the application program is activated therein, receives messages from a wireless network communication installation for short-range communication at the secure station of the object. Thus, the tracking device advantageously is capable of increasing or decreasing the mean power over time of the wireless communication module on the basis of an assessment of the detection by its wireless communication module of a message or messages from a wireless communication module of a data processing device in the list. Depending on its program, the tracking device after regular detection or receipt can infer a no-loss situation.

Advantageously, the tracking device is capable of decreasing power if its wireless communication module detects messages from a wireless communication module of a mobile data processing device that is listed in its memory. Such mobile data processing devices are not necessarily embedded in a system and can perhaps not even communicate with the tracking device. They are, for example, allocated to the object only because the tracking device often detects their messages with their respective identification, or often simultaneous with a mobile data processing device of the applicant of the object. Alternatively, the tracking device is capable of decreasing the power in consequence of the receipt of a message from the appropriate system with a no-loss notice. A system message would announce to it that an attending mobile data processing device is allocated to the object or that the mobile data processing device is allocated to the applicant of the object. Also, if the tracking device perceives many non-allocated mobile data processing devices, it can decide again to decrease a mean power over time of the wireless communication module that has been increased because of an isolation supposition.

The tracking device advantageously is capable of increasing or decreasing the mean power over time of the wireless communication module on the basis of an assessment of the receipt by its wireless communication module of a message or messages from a wireless communication module of a data processing device in which an application program is active that is conversant with the tracking device, in the sense that the processor can recognize messages originated by the application program. Preferably, the application program is conversant with the tracking device in that it can cause the wireless communication module of the data processing device to send a notice, inquiry, or statement that the processor of the tracking device can recognize, such as a no-loss notice. For example, the tracking device infers a durable connection if such a data processing device has been in regular attendance for a while and for as long as it remains in attendance with brief interruptions only. It then decreases the mean power over time. Perhaps the carrier of such a mobile telephone transports the object, or perhaps the object is stationed in the vicinity of such a short-range radio installation. The tracking device can increase the mean power again if it does not obtain messages from the data processing device for an extended period.

The wireless communication module preferably is configured for energy-saving short-range communication. An example is the radio standard Bluetooth Low Energy, also called BLE. The conversation partner for the tracking device might be a BLE module of a nearby mobile telephone. Bidirectional WiFi is also short-range, but much more energy intensive. There are attempts to develop telecommunication with comparatively small energy expenditure. To that end, a wired network with many wireless network communication installations is required, probably in partial overlap with the infrastructure of existing mobile telephone networks. Sometimes the term low power network, or LPN, is used for such telecommunication, or more specifically the term low power wide-area network. Advantageously, the wireless communication module is capable of sending tracking messages to or receiving messages from a wireless communication module of a wireless network communication installation, preferably a wireless network communication installation that is part of an LPN.

The wireless communication module is also capable of receiving messages. Therefore, it is, for example, possible that the tracking messages for the purpose of optimizing energy consumption normally contain only a system identifier and no identity notice or further statement. A computer in an appropriate search system would request an identity notice if needed.

Advantageously, the wireless communication module is capable of receiving tracking messages. More advantageously, the tracking device can route messages from another one, at least occasionally. Such tracking devices in dependence on their wake-up timing rules more or less constitute a mesh network.

The term mobile data processing device of course means an application-program-competent mobile telephone in particular. Other portable data processing devices, such as a laptop computer or a play console, can forward the content of tracking messages as soon as they are connected to the Internet, be it by means of wireless short-range communication or by plugging them in. Concerning the other direction, they can send the tracking device a previously received message from a search system, that is, a system message.

The system for finding objects according to the characterizing features of claim 13 comprises a system computer that is capable of dispatching a system message with a no-loss notice or capable of dispatching a system message with a loss notice or capable of dispatching a system message with an at-rest notice to the tracking device.

The system computer, for example, is capable thereof on the basis of an entry from a data processing device of the applicant of the object. Alternatively, it is capable of dispatching a system message with a no-loss notice on the basis of an assessment of the detection by the wireless communication module of the tracking device that is attached to the object of a message or messages from a wireless communication module of a data processing device that is allocated to the object, or an assessment of the detection of a tracking message or tracking messages in the opposite direction.

Advantageously, the tracking device is capable of decreasing its power in consequence of the receipt of a system message with a no-loss notice. As a particular consequence of a no-loss notice, the tracking device is restrained from conducting a query with increased power of its wireless communication module in case of a subsequent transport supposition, because the object apparently is in good hands, even if it is still being transported.

In the system according to the invention, the system computer is also capable of maintaining a list of the objects in its memory, in each case with a statement at least on the applicant thereof, on communicating with data processing devices of the applicant and on whether the object has been lost. The statement on the applicant of an object in the list of the system computer does not require knowledge of his identity. Anonymous data are meant as well, for example, the Internet e-mail address of his listed data processing devices.

Advantageously, the system computer is capable of dispatching a system message with statements from the list to a tracking device.

Advantageously, the system computer is capable of maintaining the list with a statement on mobile or non-mobile data processing devices that are in each case allocated to an object. Such a list optionally is maintained also in the memory of the respective tracking device, or alternatively only therein. Advantageously, the system computer is capable of allocating a mobile data processing device to an object on the basis of an assessment at least of the rate of occurrence of messages of its wireless communication module that the wireless communication module of the tracking device that is attached to the object detects when the system can assume that the object is safely stationed or stored.

Optionally, the system computer is capable of dispatching a system message with an attendance notice to a data processing device of the applicant on the basis of an assessment of the detection by the wireless communication module of the tracking device that is attached to the object of a message or messages from a wireless communication module or from wireless communication modules of the mobile or non-mobile data processing devices that are allocated to the object, or in the opposite way, an assessment of the detection by a wireless communication module of such a data processing device of a tracking message or tracking messages from the wireless communication module of the tracking device. An attendance notice might help the applicant of the object make a decision on a loss inquiry, for example, because he recognizes the telephone number that is cited therein. The detection of a message by a wireless communication module, of course, also can occur when the message was not meant to be received by it. It already suffices if the identity of the sender can be determined.

In an exemplary embodiment, data processing devices that are not even capable of communicating with the tracking device, for example, because a compatible application program has not been installed, are allocated to the object.

Advantageously, the system computer is capable of shaping, in accordance with an entry in the list by virtue of a message from a data processing device of the applicant of an object, the effect of the allocation of a data processing device, preferably capable of limiting the effect of the allocation in time. For example, in answer to a loss inquiry with an attendance notice, the applicant fixes the period in which the object is deemed to be safe at two weeks and only if the tracking device is transported in regular attendance of the same mobile telephone. As an alternative, the applicant fixes a period in advance. In a further example, a transported tracking device must not render increased power of the wireless communication module, as long as it is in attendance of a certain wireless network communication installation at least once per day, therefore not constantly.

Advantageously, the mobile data processing device comprises an operating interface, and the mobile data processing device is part of a separate system that is capable of planning the transport of objects or persons. Preferably, the operating interface has been shaped, in order specifically to enter or to read out data on the transport. For that purpose it comprises, for example, a touch-sensitive display screen, a processor, and a program. Upon activation of the program, entry buttons are shown on the display screen with symbols or with text concerning certain directly relevant statements for the transport on status, such as "delivered." Preferably, the separate system is capable of planning the transport of objects or persons by persons who take the mobile data processing devices with them in their vehicles or in their pants pockets. The separate system, by way of example, is used by the postal service, or by the garbage disposal service, or by an enterprise for the delivery of parcels, or for a taxi service. Further examples are systems used by the police, which can fulfil additional tasks. In their professional way, the postal carrier, trash collector, delivery van driver, taxi driver, or police officer brings these mobile data processing devices to many places in which lost may be found. Because these mobile data processing devices must be reliably able to perform a great deal of calculation and communication, they are regularly charged via an electrical plug in the service vehicle, which is already present, or they feature an appropriate amount of battery capacity. This casually allows the long-term activation of the application program and the long-term operation of the short-range radio module of the system according to the invention.

The system computer preferably is capable of at least temporarily dispatching system messages for a data processing device of an applicant of an object, additionally or alternatively to a data processing device of a replacement person, on the basis of a message from a data processing device of the applicant, and processing certain messages from the data processing device of the latter instead of messages from the data processing device of the applicant.

Preferably, a data processing device in which an application program that is conversant with the tracking device is active is capable of dispatching an applicant message with information concerning activation of the application program to the system computer. The system computer is capable of maintaining in its memory such information concerning previous activation. This information may be used to give the applicant an incentive for activating the application program often, which is beneficial to every user of the system because their data processing devices form a community, but which requires the applicant to charge its battery-driven data processing device more often. As an incentive, he might get a reduction of his regular subscription fee in return. The reduction might even depend on activation in critical areas or at critical times where and when it is most needed. Advantageously, the system computer is capable, with specific permission by the applicant, of activating or deactivating the application program remotely.

If the wireless communication module of a data processing device that has been switched on receives tracking messages for some time, the system computer can infer that the data processing device is continuously in the vicinity of the object. For this, an application program in the data processing device must be activated for translating the tracking messages and forwarding them via the communication network to the system computer. Advantageously, the system computer is capable of dispatching a system message with a durable connection notice regarding a data processing device of the communication network to the tracking device, preferably on the basis of an assessment of the receipt by the wireless communication module of the tracking devices of one or several messages from the wireless communication module of the data processing device, or vice versa. Thus, the system computer can initiate a decrease by the tracking device of the mean power over time of its wireless communication module.

The communication network to the system according to the invention comprises, by way of example, both the Internet and mobile telephone networks. Its wireless communication modules, for example, include some according to the Wifi standard with connection to the Internet, or mobile telephones, each with a module according to the Bluetooth standard, also called BT. It is expected that wireless communication modules of the network, in particular those of its wired backbone, say the Internet, might communicate with each other or with wireless communication modules of tracking devices via short-range light modulation, also called LiFi. As soon as they are available, wireless network communication installations for data-lean telecommunication traffic, colloquially called LPN, may also count as wireless communication modules of the communication network.

Advantageously, a wireless communication module or wireless communication modules of the communication network are capable of appraising the direction or the path length of signals with a tracking message, and the system comprises a computer that is, on the basis of an assessment of such appraisals and on the basis of data on the position of the at least one appraising wireless communication module, capable of appraising the position of a tracking device. Preferably, the communication network comprises wireless network communication installations, and a wireless communication module or wireless communication modules of the wireless network communication installations are capable of appraising the direction or the path length of signals with a tracking message. The appraisal can also occur by multiangulation or multilateration or a combination of angulation and lateration, even in a single wireless network communication installation.

For multilateration, the path length of a signal with a tracking message is advantageously appraised by incorporating a precise sending time statement of certain aspects of the telegram in the tracking message. A receiving wireless communication module measures the precise time of receipt thereof. By way of example, the wireless communication module calculates a value for the path length and dispatches this value together with a statement of its identity to the computer. In an alternative, less precise multilateration, the involved wireless communication modules measure the strength of receipt of the respective signals with the tracking message and forward these measurement values to the computer.

Clients of someone exploiting such a system according to the invention typically are the object owners and perhaps insurance companies, non-profit associations, private security services providers, railway operators, the police, customs authorities, city councils, and so on.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

Figure 1:
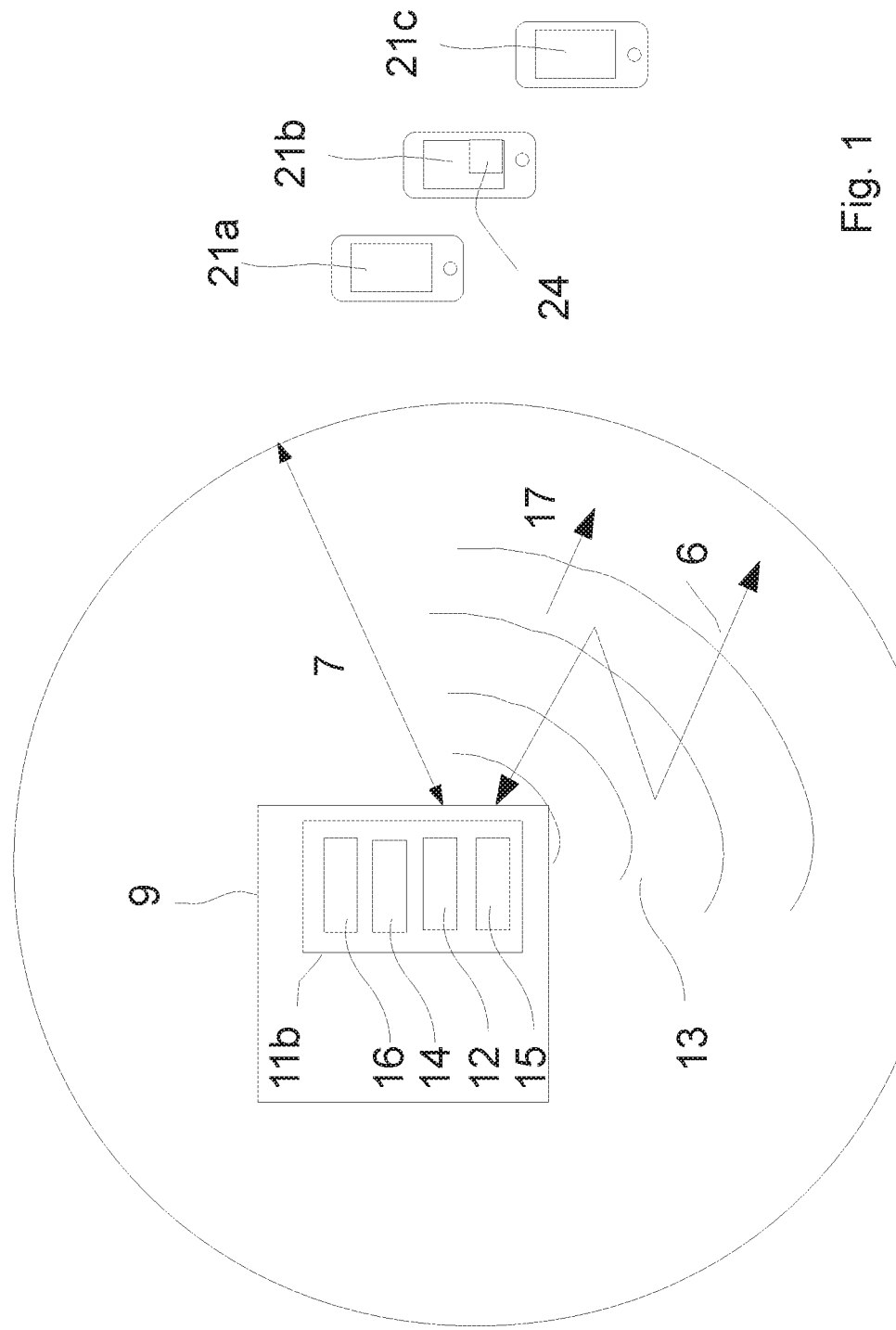
FIG. 1 shows a system with a tracking device according to an embodiment of the present invention attached to an object outside the reach of mobile telephones.

Turning now to the figures, FIG. 1 schematically displays a system and an object 9 that is equipped with a tracking device 11b. The tracking device 11b consists of a printed circuit board, also called PCB, on which its electronic components are held, a processor 14, an electrical power source 15, a GPS module 16, which together with an assessment program on processor 14 builds a motion detector, and a wireless communication module 12, which is built as a BLE module with an antenna.

The GPS module 16 usually is not active, so as to keep the energy consumption of tracking device 11b as low as possible. The wireless communication module 12, a short-range radio module, has been activated and attempts to build a connection by means of regularly sent signals 13, for example, sent once every 2 S to 30 S, in order to communicate via a short-range BLE communication connection 6 with the mobile telephones 21a, 21b, 21c, which may be equipped with an application program 24, wherein the reach 7 for example amounts to 20 meters (M) to 50 M, dependent on parameters such as the surroundings, antenna, sender strength, electrical power source 15, and other factors. The mobile telephones 21a, 21b, 21c all are located outside reach 7 of the BLE communication connection 6. Only in mobile telephone 21b has an application program 24 been installed, which could assess signal 13 from wireless communication module 12 of the tracking device 11b to object 9 at sufficient strength of receipt. The installation of the application program 24 in the mobile telephone 21b has the effect that the mobile telephone 21b obtains access, at least, but not only, to a memory 31 of a system computer with statements on lost objects from a list of objects, and in mobile telephone 21b the BT or the BLE function is switched on and the release of GPS information is allowed. Mobile telephones 21, 22 with the installed application program 24 build their own community.

Figure 2:
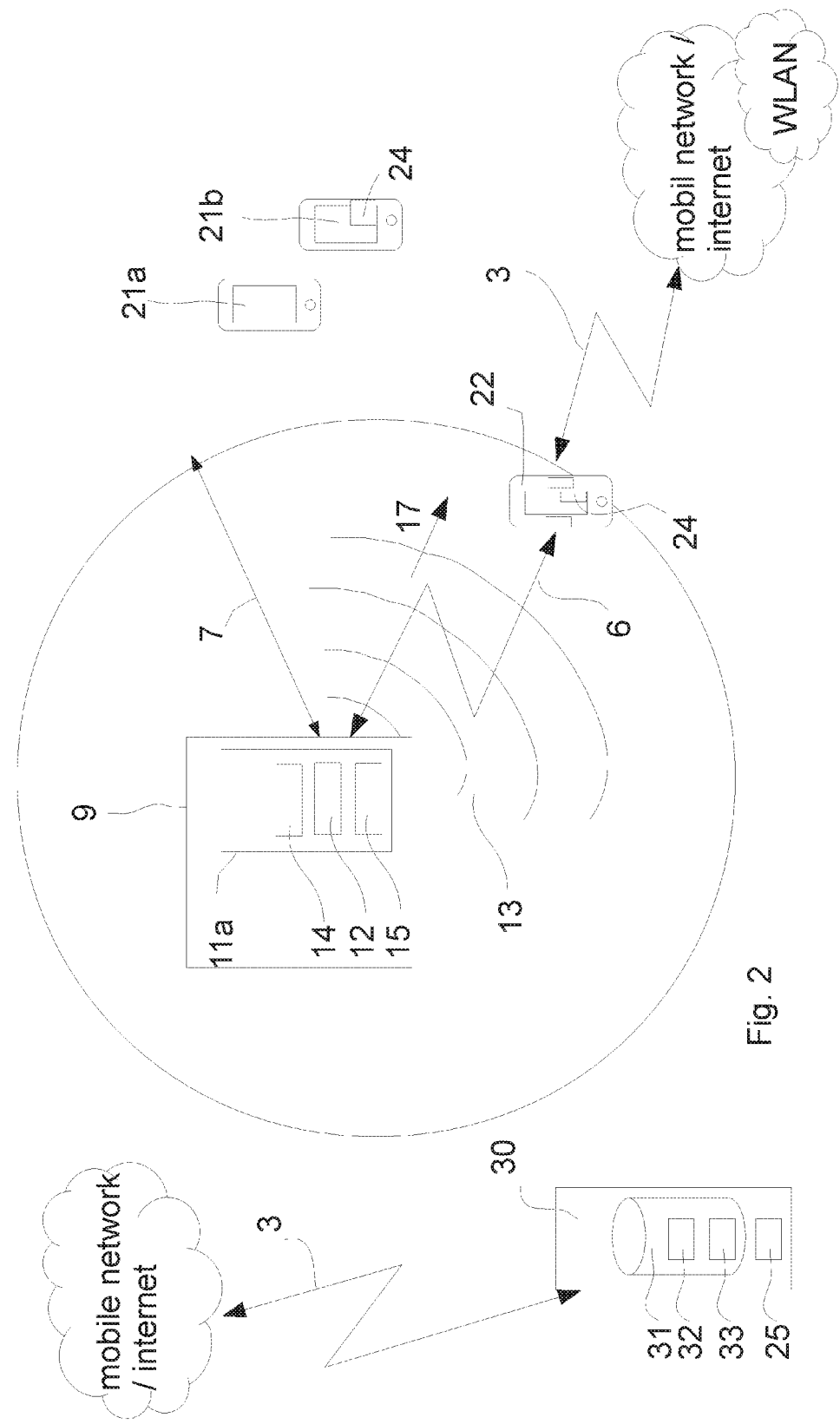
FIG. 2 shows a system according to the invention with a tracking device according to an embodiment of the present invention attached to an object in reach of a mobile telephone of a mobile radio network.

FIG. 2 shows, again schematically, a system according to the invention and an object 9, which is equipped with a tracking device 11a, consisting of a processor 14 and an electrical power source 15, and of a wireless communication module 12, which is equipped with an antenna. The activated wireless communication module 12 attempts by means of a periodically sent signal 13 to make a connection to a wireless communication module of a mobile data processing device 22, to with a mobile telephone, and to transfer at least the tracking message 17 from tracking device 11a, which uniquely identifies the tracking device via a short-range BLE communication connection 6 to the mobile telephone 22, which is equipped with an application program 24. For this, mobile telephone 22 and at least application program 24 must necessarily be switched on, or respectively active. If the mobile telephone 22 is located within reach 7 of the BLE communication connection 6, the wireless communication module of the mobile telephone 22 receives at least but not only the tracking message 17 of the wireless communication module 12 of the tracking device 11a to the object 9. The mobile telephone 22 is connected, additionally, via long-range communication connection 3 either with the mobile Internet, for example, along the GSM, GPRS, UMTS, LTE or another standard, or via a WLAN connection. The application program 24 causes on-line access to system computer 30 and to memory 31 thereof, or has access to a temporarily stored list of lost objects in the mobile telephone 22, which is derived from list 32 of the objects in memory 31. Because object 9 is in the "not-lost" status, the receipt of tracking message 17 on the part of object 9 in mobile telephone 22 does not trigger further action. For the sake of privacy protection, the mobile telephone 22, or respectively the application program 24 does not necessarily have statements on or indications of the identity of who possesses object 9. For convenience, only a single mobile telephone 22 equipped with an application program 24 is depicted in FIG. 2 within reach 7 of the BLE communication connection 6 of object 9. It goes without saying that several mobile telephones 22, 21b may be within reach 7 of the BLE communication connection 6 of object 9.

Figure 3:
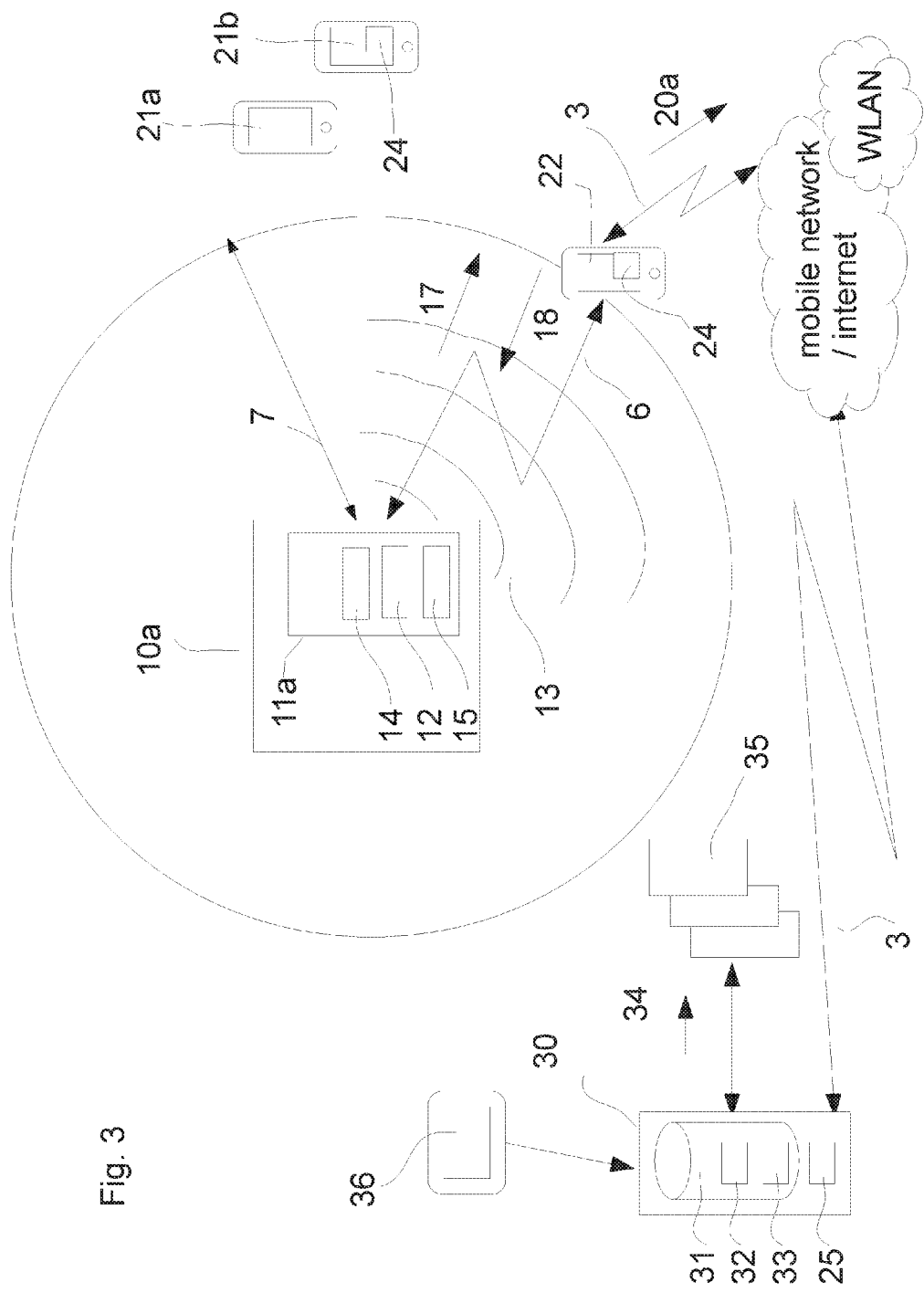
FIG. 3 shows a system according to the invention with a tracking device according to another embodiment of the present invention attached to an object in reach of a mobile telephone of a mobile radio network.

FIG. 3, again schematically, shows a system according to the invention. If the object 10a is reported lost or unfindable by the possessor, possibly following a loss inquiry dispatched by system computer 30, the status of the respective object in list 32 installed in memory 31 on the system computer 30 is changed by the possessor or by an operator 36, and object 10a is entered into the list 32 of lost objects. The system computer 30 then dispatches a system message with a loss notice to the tracking device 11b, which, appropriately translated, is forwarded at the first opportunity by a mobile telephone with an activated application program.

The application program 24 has either only on-line access to the list 32 of lost objects, or the mobile telephone possesses a periodically updated copy of a part of the list of lost objects.

Because object 10a has the status "lost," the receipt of tracking message 17 in the mobile telephone 22 triggers further action. The application program 24 recognizes by means of tracking message 17 and information in the list 32 of lost objects that object 10a is marked as "lost." If the release of the GPS position data in mobile telephone 22 is switched on, application program 24 sends a message with a position statement 20a, consisting of the translated tracking message, the GPS position data of mobile telephone 22 and the actual time, via the long-range communication connection 3 in the mobile radio network, or respectively via the Internet, to system computer 30. If no GPS position data are available in mobile telephone 22, the application program 24 only sends the translated tracking message and the actual time.

With help of the translated tracking message, including the position statement 20a therein, or respectively of the translated tracking message and the client data 33 stored in memory 31, an administrative program 25 in system computer 30 can send one or more messages 34 with the relevant client and object data, considering the privacy protection provisions in force, to various interested parties and recipients 35, such as, for example but not exclusively, the possessor, the police, insurance companies, customs services, or the like. These then adopt further procedures concerning the object 10a that is registered as lost, in particular as stolen. After successful transmission, application program 24 causes the wireless communication module of the mobile telephone 22 to send system message 18 with a loss notice from system computer 30 to tracking device 11b. By means of one or more system messages 18 via the BLE communication connection 6, various functions in the tracking device 11a can be activated, for example, activating, or deactivating a siren or a battery tester or a movement sensor or the sender of the wireless communication module 12. Thus, the tracking device 11a in particular can increase or decrease the mean power over time of the wireless communication module 12.

Figure 4:
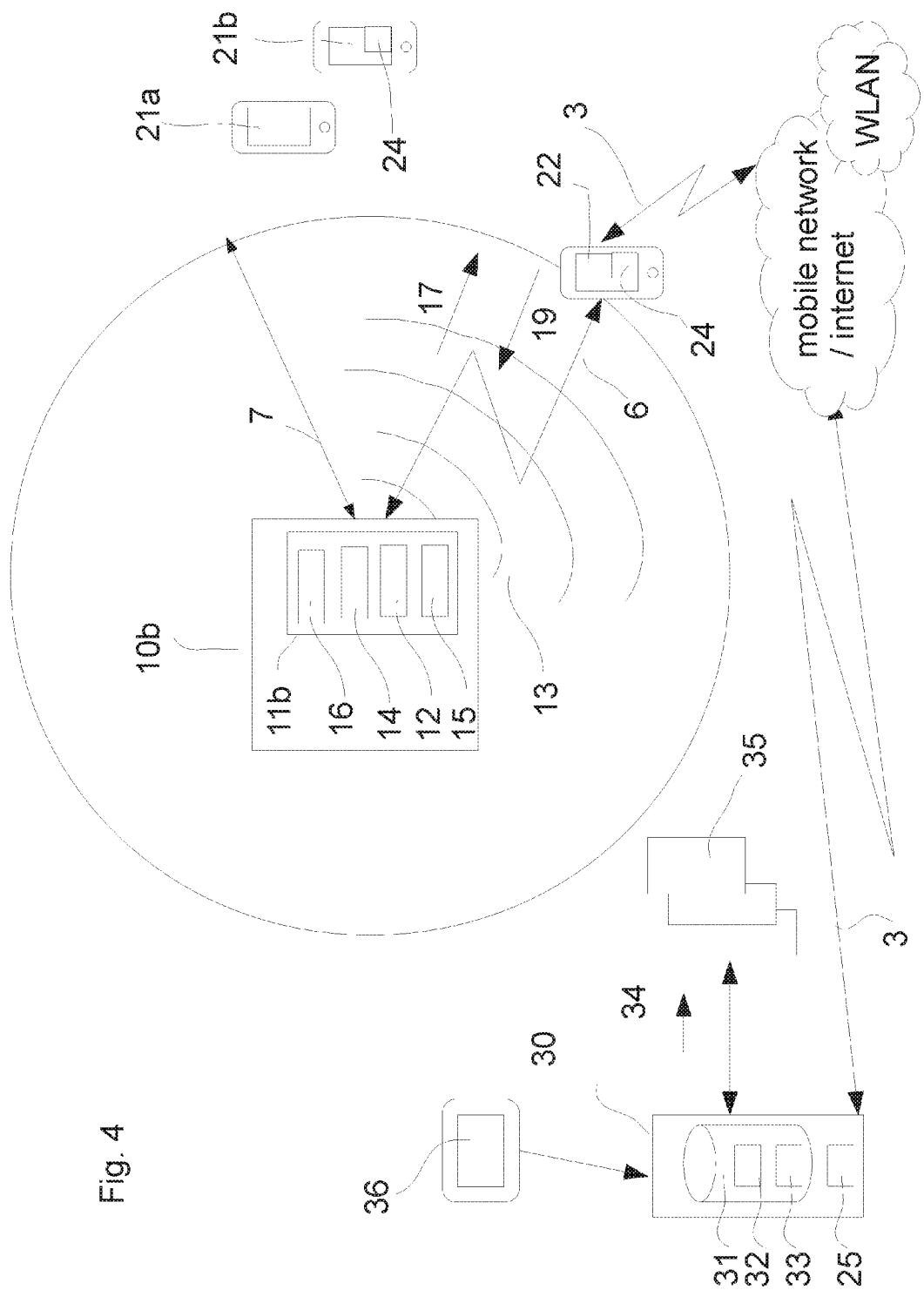
FIG. 4 shows a system according to the invention with a tracking device according to yet another embodiment of the present invention attached to an object in reach of a mobile telephone of a mobile radio network.

Again schematically, FIG. 4 shows a system according to the invention, and an object 10b, which has been reported by the applicant as lost, particularly as stolen. The application program 24 in mobile telephone 22 is switched on. Mobile telephone 22 is located in reach 7 of the BLE communication connection 6 of object 10b. A tracking device 11b is loaded with a GPS module 16, which is in an inactive state of operation B1 and therefore essentially does not consume current. The loss notice corresponding to the status "lost" is sent via the short-range BLE communication connection 6 as system message 19 to the wireless communication module 12 of tracking device 11b, with the consequence that the GPS module 16 in tracking device 11b is put in active state of operation B2 and is provided with current thanks to the electrical power source 15, wherein the activation can take several seconds, for example, 30 S.

Figure 5:
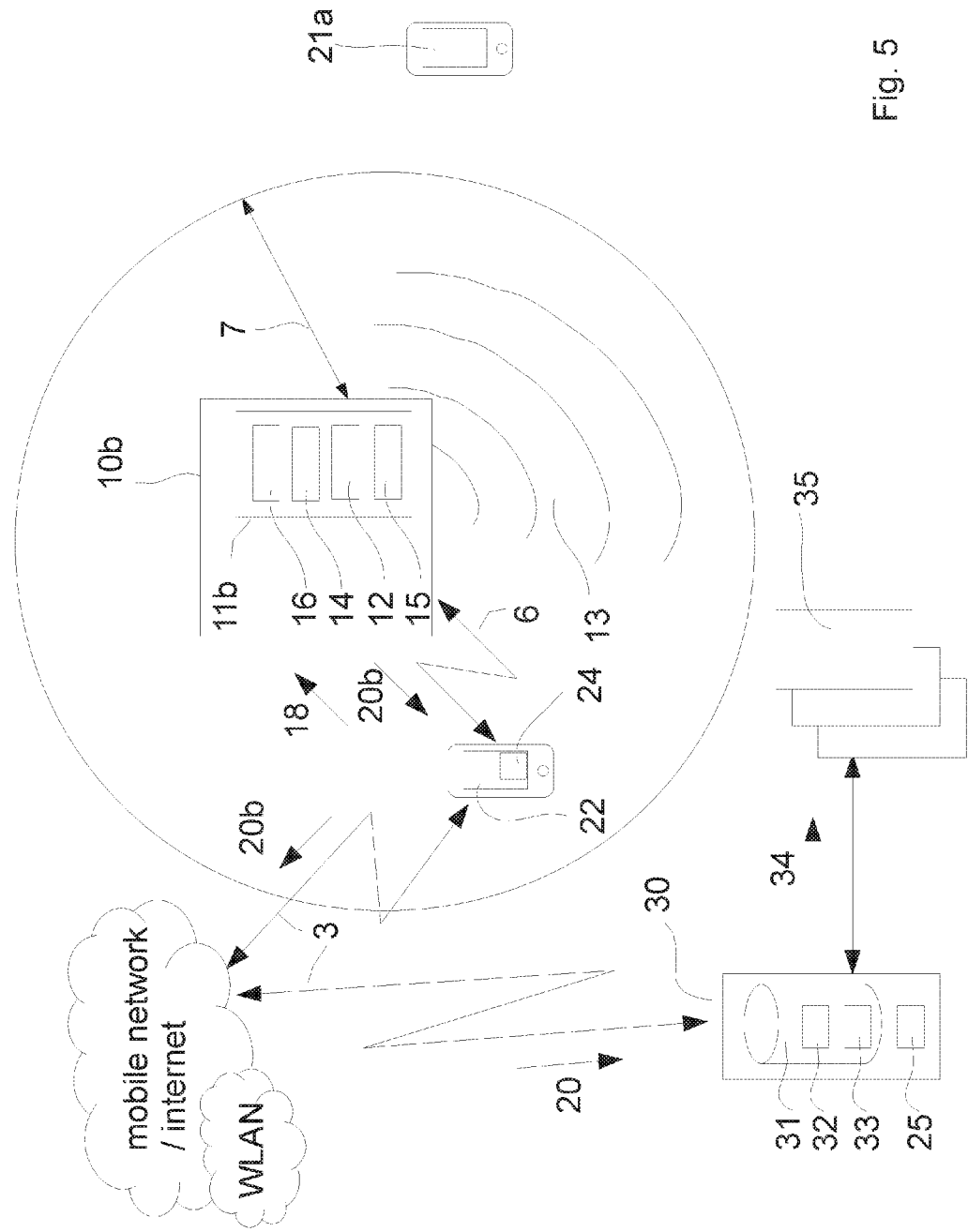
FIG. 5 shows a system according to the invention with a tracking device according to a further embodiment of the present invention attached to an object in reach of a mobile telephone of a mobile radio network.

FIG. 5 shows a system according to the invention, again schematically, and an object 10b that has been reported as lost, wherein mobile telephone 22 has continued to move relative to the position of the object 10b in FIG. 4, but remains within reach 7 of the short-range BLE communication connection 6, and in a first step receives a message with a position statement 20b from wireless communication module 12 of the tracking device 11b to object 10b, consisting of the translated tracking message, the precise GPS position data of tracking device 11b, as well as the actual time. In a second step, the message with a position statement 20b is transferred via the long-range communication connection 3 to the mobile radio network, or respectively via the Internet, to the system computer 30. With the help of the message with a position statement 20b and the client data 33 stored in memory 31, the administrative program 25 in system computer 30 can send one or more messages 34 with the relevant client and object data to various interested parties and recipients 35, for example but not exclusively, the possessor, the police, insurance companies, customs services, or similar. These then adopt further procedures concerning the object 10a that is registered as lost, in particular as stolen.

If mobile telephone 22 has been switched on with an active application program 24 and is located for a prolonged time within reach 7 of the BLE communication connection 6, its wireless communication module often receives tracking messages 17 from wireless communication module 12 of tracking device 11b attached to the object 10a. On the basis of an assessment of the received tracking messages 17, system computer 30 assumes that the object is attended by this mobile telephone 22 at a short distance. Then, it dispatches a system message 18 with a durable connection notice regarding the mobile telephone 22 to the tracking device 11b. After receipt thereof, the tracking device 11b fixes the mean power over time of the wireless communication module 12 at a low value.

During transport, a durable connection normally occurs with the mobile telephone of the applicant of the object, or with another mobile telephone that the applicant has registered or, depending on settings by the applicant, with another mobile telephone from which the system computer often has perceived a message detection by the wireless communication module of the tracking device. The system computer 30 is capable of maintaining a list stating such data processing devices 22 and, after this tracking message 17 has been forwarded to it, capable of dispatching a system message 18, 19 with the durable connection notice to the tracking device 11a, 11b, and as the case may be a system message 18, 19 with an attendance notice to a data processing device of the applicant. If the applicant answers thereto that the attendant data processing device in the circumstances does not repeal the suspected loss, for example, because the listed mobile telephone that often appears in receiving range is not at all known to him, or because he had already not allowed anyone to transport the object, the system computer does not issue a no-loss notice to the tracking device 11a, 11b but, if it had not done so already, a loss notice. Also, if so instructed in the answer by the applicant, the system computer dispatches a system message with the identity of the durably connected telephone to his object insurer and to an Internet website for remotely preparing a police report of theft.

Figure 6:
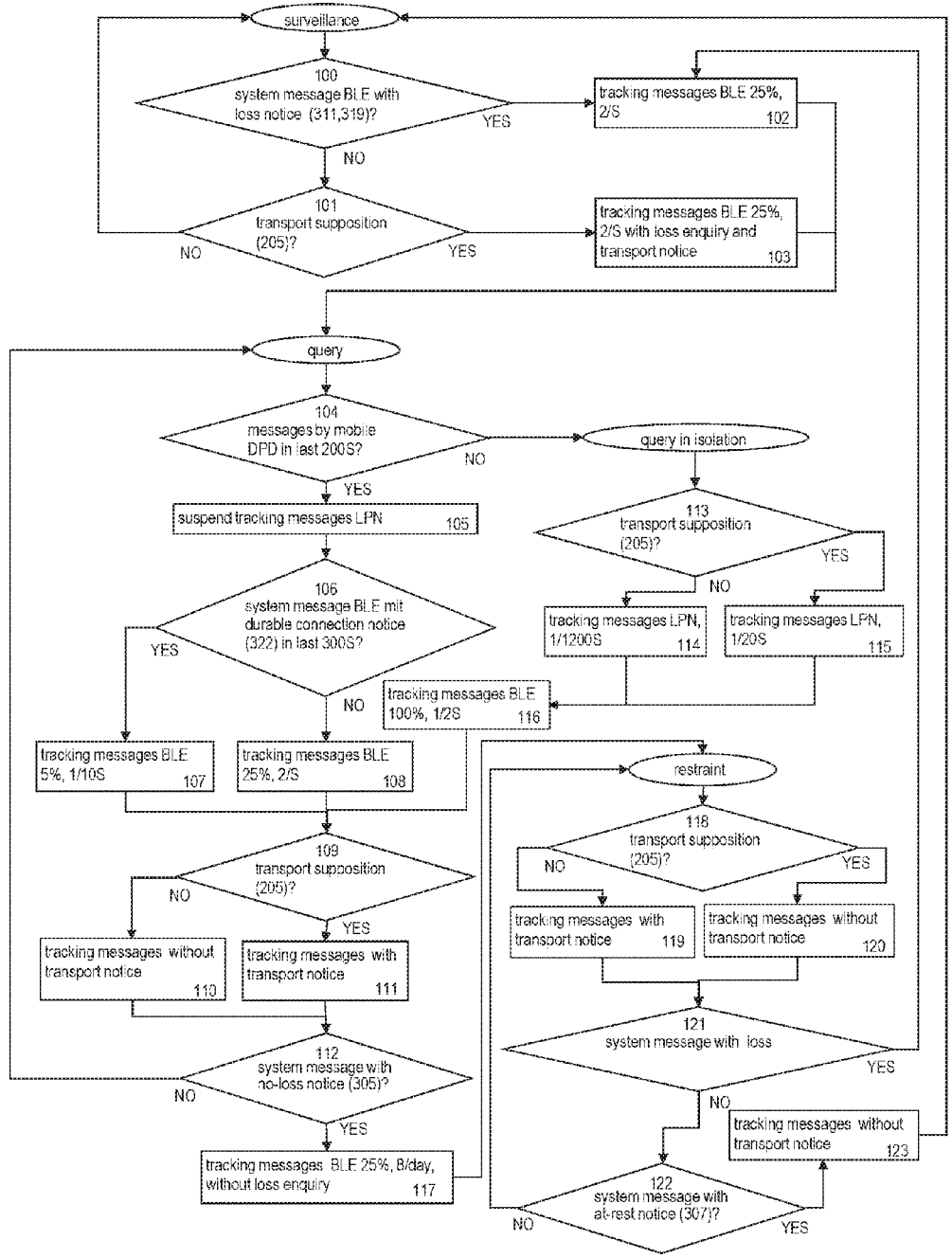
FIG. 6 shows a flow chart of a program for the processor of a second tracking device according to the invention, sending tracking messages by means of the wireless communication module thereof.

FIG. 6 shows a flow chart of a program for the processor of a second tracking device according to the invention on sending tracking messages by means of the wireless communication module thereof.

By virtue of the program, the tracking device is capable of autonomously triggering the wireless communication module to send a tracking message, and of increasing, at least temporarily, the mean power over time of the wireless communication module. Distinct from the first tracking device according to the invention, it features an acceleration sensor as motion detector, and thanks to that, can infer a transport supposition. Its wireless communication module is competent to communicate bi-directionally, both short-range according to BLE and in mobile telephone distance according to LPN. In an alternative, the wireless communication module additionally receives or sends another type of tracking messages, in particular according to WiFi, which requires much energy by comparison.

The tracking messages according to BLE include a system identifier and a notice of identity. A non-depicted variant of tracking messages does not contain a notice of identity. The notice of identity will only be added once, on specific request in a system message, or regularly after receipt of a system message with a loss notice.

Each time after sending a tracking message, the processor offhand keeps the wireless communication module ready to receive by frequently switching it on briefly during 120 S, so as to receive system messages that are dispatched in reply immediately or that already have accumulated. Afterwards, the processor normally switches off the wireless communication module. If it supposes a transport or a position in isolation, or under other circumstances, the tracking device advantageously leaves the wireless communication module switched on permanently or briefly but at least once per minimum duration of a system message, in order always to be able to receive a system message in reach, optionally until a system message with a no-loss notice arrives. A variant of the processor leaves the wireless communication module in a suitable state for receiving system messages during a period that has been adapted to the circumstances.

For the purpose of limiting its energy consumption, and because of data protection risks, the tracking device has not, by programming or otherwise, been made capable of maintaining in its memory a list of the data processing devices that are allocated to the object, in contrast to the first tracking device according to the invention. A variant of the tracking device already carries the data of a list that is maintained on every occasion and can decide whether an attending data processing device is known to it without an appropriate system message, that is, up to a possible denial by the applicant per system message.

In summary, FIG. 6 shows all operating states of the tracking device: surveillance, query, query in isolation and restraint. If it is assumed that the object has been stationed or stored securely, the processor regularly runs through a surveillance loop 100, 101, in which the movements of the tracking devices are being observed and tracking messages are only rarely sent for the purpose of saving energy. The receipt of a system message with a loss notice 100 or a transport supposition 101 repeals this assumption and triggers a query. In preparation thereof, the processor strongly raises the sending rate of the tracking messages 102, 103. In the query loop 104, 105, 106, 107, 108, 109, 110, 111, 112, it adapts the sending rate and the sending strength to the circumstances and finds out whether the object is lost. If it finds out 104 that the object is in isolation of all mobile radio traffic, the processor swaps to query in isolation 113, 114, 115, 116, 109, 110, 111, 112, 104. Then, the tracking messages are sent less often but with full strength, not just in accordance with BLE but also in accordance with LPN. As soon as the processor receives 112 a system message with a no-loss notice, he enters into the state of restraint, because the object would be in good hands even if it is still being moved. In advance of this message, the processor decreases the sending rate of the tracking messages to the same level as during surveillance. Energy saving applies again in the restraint loop 118, 119, 120, 121, 122. Upon a system message 121 with a loss notice, the processor swaps back to the query loop, or to the surveillance loop upon a system message 122 that the object is securely stationed at rest.

FIG. 6 shows the flow chart in detail. In the surveillance state, the wireless communication module only sends a tracking message 8 times per day, in fact, only via BLE. The sending power corresponds to 25% of what is lastingly possible at most. These tracking messages first serve the purpose of informing the related system whether the resting tracking device can easily give notice of its current location. They announce key data on the state of the battery at the moment. Finally, the tracking device can be set so as to report, with these tracking messages, potentially available statements on the identity of a data processing device if the wireless communication module thereof is often received by the wireless communication module of the tracking devices. A variant of the tracking device additionally features a radiation sensor or an acoustic sensor. In that case, it can announce simple findings from the assessment of the sensor signals to the related system with such tracking messages.

The processor examines 8 times per day 100 whether the wireless communication module has received a system message with a loss notice. It examines continuously whether the signals of the acceleration sensor lead to a transport supposition 101. In both events, it raises the sending rate of tracking messages to once per 0.5 S 102, 103, and thus the mean power over time of the wireless communication module. If it supposes a transport, it adds a transport notice and a loss inquiry to each tracking message 103.

In the query state, the processor examines over and over again whether the wireless communication module detects messages from mobile data processing devices at all 104. If no such radio traffic has arrived during the last 1200 S, it supposes that the object is located in isolation, which induces it to send tracking messages according to LPN. Otherwise, however, it stops sending any such message 105 and examines whether the wireless communication module has received a system message with a durable connection notice 106. Following a durable connection notice, the processor fixes the sending power at 5% and the sending rate of the tracking messages at once every 10 S 107, or instead at the aforementioned values 108 as soon as it appears that the data processing device concerned has distanced itself or the application program thereof has been deactivated. Subsequently, the processor examines whether a transport supposition is present 109, and determines that further tracking messages therefore include 111 a transport notice, or determines that they do not. 110. Finally, the processor examines whether the wireless communication module has received a system message with a no-loss notice 112.

If the wireless communication module has not detected any message from a mobile data processing device during 1200 S, the processor swaps into the state of query in isolation 104. The processor then regularly examines whether a transport supposition is present 113, this time for deciding autonomously whether to send the tracking messages according to LPN once every 20 S 114 or instead only once every 600 S 115. That is to say, the relatively large effort of sending tracking messages according to LPN hardly pays off if the object is motionless in one location, because the wireless network communication installations of the LPN network do not move either. The processor fixes the sending power of the tracking messages according to BLE at 100% and their sending rate at once per 2 S 116.

If the processor becomes aware that the wireless communication module has received a system message with a no-loss notice 112, the state of restraint follows. The processor still examines often whether a transport supposition is present 118 and as a consequence determines that further tracking messages include a transport notice 119 or that they do not 120. Likewise, it examines receipt of a system message with a loss notice 121, which would bring it in the query state again. Following a system message with an at-rest notice 122, it removes any and all transport notice from the tracking messages 123, which are seldom and weaker, and re-enters the surveillance state, thus closing the loop.

Figure 7:
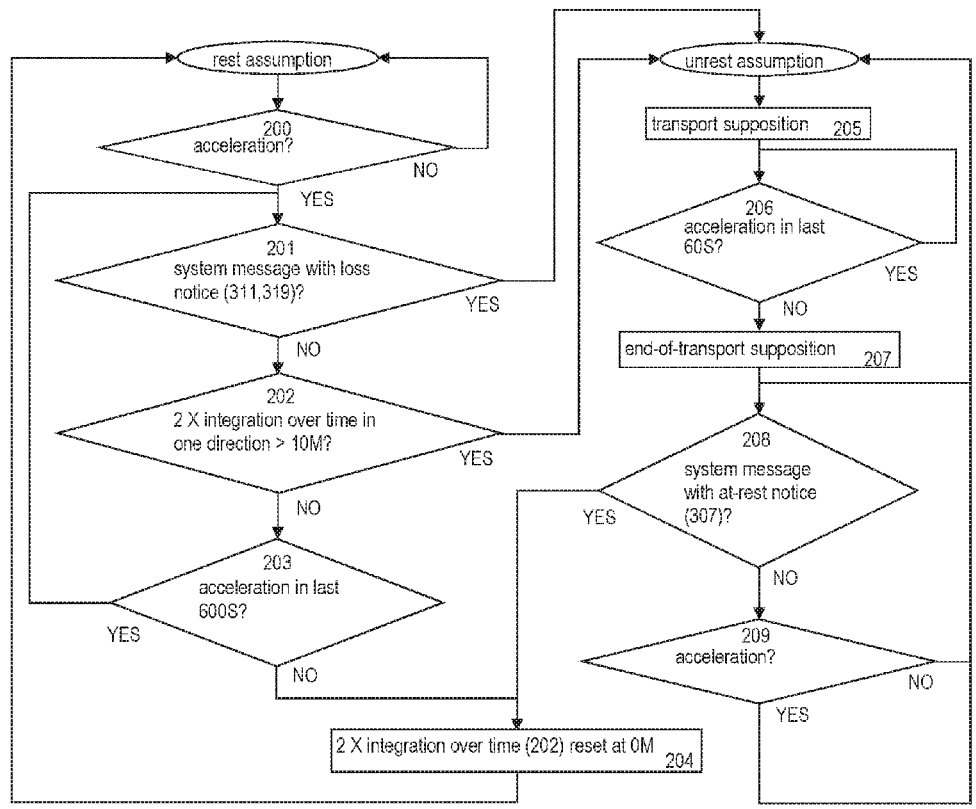
FIG. 7 shows a flow chart of a program for the processor of the second tracking device according to the invention in order to evaluate whether motion signals lead to a transport supposition.

FIG. 7 shows a flow chart of a program for the processor of the second tracking device according to the invention in order to evaluate whether motion signals lead to a transport supposition 205.

The tracking device features an acceleration sensor for detecting motion. The acceleration sensor can sense acceleration in three independent directions, but not angular acceleration. Variants of the motion detector additionally comprise an angular acceleration sensor or an angular rate sensor, or a compass. These variants allow a more precise estimation of the transport distance.

The processor is capable of determining a transport supposition 205 at least on the basis of double integration of the acceleration over time and, in case of recent acceleration, on the basis of the rate of the occurrence or the nature of the accelerations. Following a long standstill, its estimation of the distance by double integration of the acceleration over time is reliable. Therefore, it uses this method of assessment when the tracking device is in the rest assumption state 200, 201, 202, 203, 204. After a first transport supposition 205, however, its calculation of the actual speed, and therefore the estimation of the distance by double integration of the acceleration over time, gradually can become imprecise because of measurement inaccuracy of the acceleration sensor. Thus, the processor swaps to a state of assuming unrest 205, 206, 207, 208, 209. Now, the typical accelerations of transportation by train or in road traffic or on foot already suffice for maintaining or reviving the transport supposition. Only if the processor gets a system message that the object is at rest again, it swaps back to the rest assumption state, and it also changes the method of assessing the acceleration signal. In an alternative version, the processor autonomously swaps back into the rest assumption state if the acceleration sensor for an extended period of time does not sense acceleration, for example during 600 S.

In the state of rest assumption, the processor often examines whether the acceleration sensor signals acceleration 200. If that happens, it examines whether a system message with a loss notice has arrived 201, which would cause a transport supposition 205, and whether the double integration of the acceleration over time already amounts to more than 10 M 202, which also would cause a transport supposition 205, and whether the last acceleration signal occurred already more than 600 S ago 203, which would cause a reset of the accumulated distance according to the double integration of the acceleration over time 204.

In response to a transport supposition 205, the processor has swapped into the unrest assumption state. Now, for lack of reliable knowledge on its speed, it no longer calculates the double integration of the acceleration over time, but rather examines whether acceleration again occurs within every 60 S 206, which would lead to continuation of the transport supposition. If during 60 S no acceleration has been detected at all, the processor ends the transport supposition 207. However, because it cannot yet assume that the tracking device is at rest, the transport supposition is triggered again 205, already at the slightest acceleration 209, unless in the meantime the processor has perceived the receipt of a system message with an at-rest notice 208. On the basis of a system message with an at-rest notice, the processor first resets the accumulated distance according to the double integration of the acceleration over time at 0 M 204. With that, the process starts anew.

Figure 8:
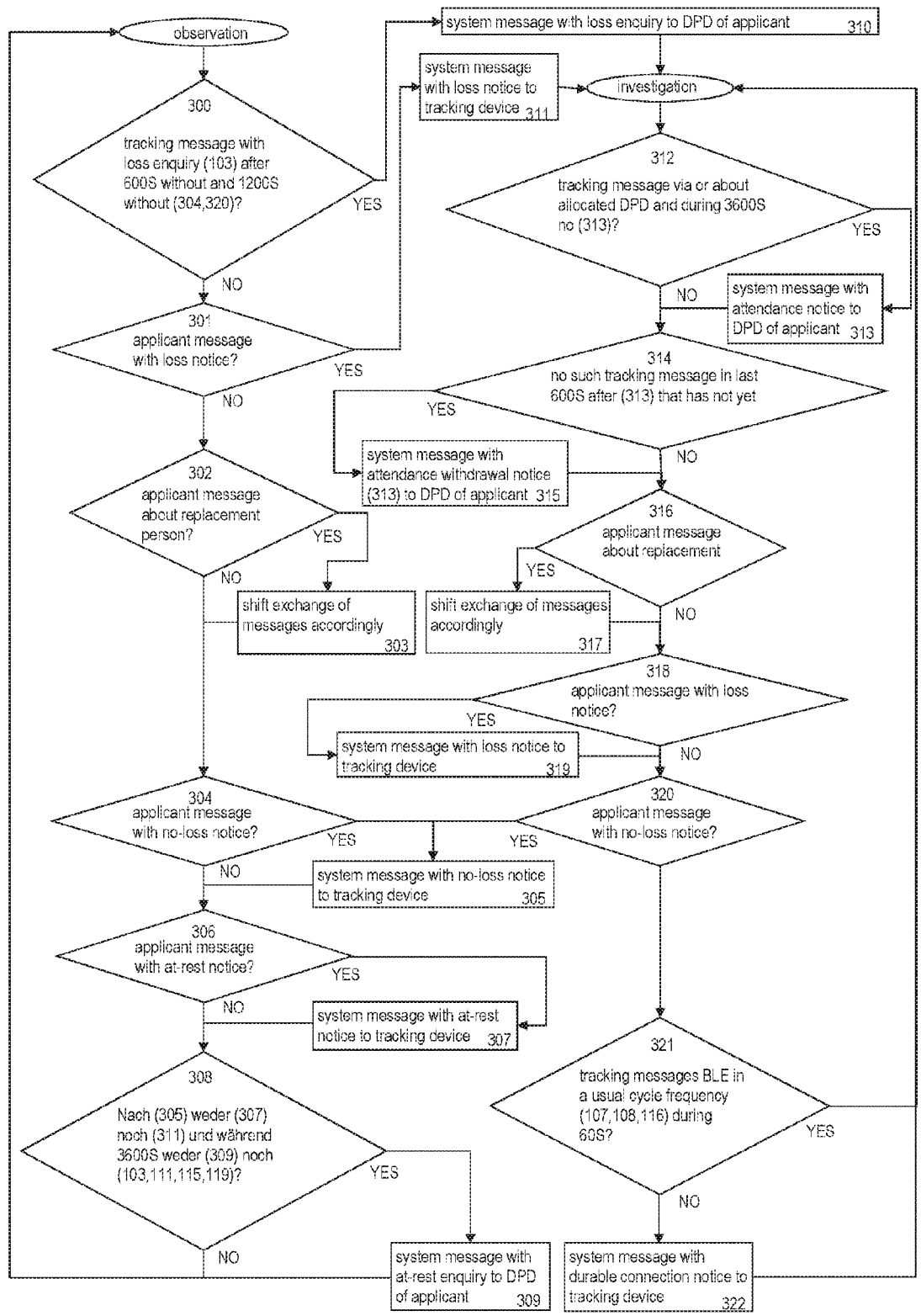
FIG. 8 shows a flow chart of a program on dispatching system messages for the system computer of a system according to the invention that comprises the second tracking devices according to the invention.

FIG. 8 shows a flow chart of a program on dispatching system messages for the system computer of a system according to the invention that comprises the second tracking devices according to the invention.

By means of an operating interface, the system enables the applicant to set the aforementioned parameters, such as the duration of many periods, at various values.

In summary, FIG. 8 shows the states of observation and investigation. In the observation state, the object is expected to have been safely stationed or stored. The system computer runs through the corresponding loop 300, 301, 302, 303, 304, 305, 306, 307, 308, 309, until it perceives a loss inquiry or a loss notice. Thereupon it dispatches respective system messages 310, 311 and investigates the loss of the object. In this state of operation 312, 313, 314, 315, 316, 317, 318, 319, 320, 321, 322, it examines in particular whether the tracking device is attended by a data processing device that is accredited to it 312, 314, and whether it has a durable connection to a data processing device of the communication network with an activated application program 321. In both states, the system computer examines whether a message from a data processing device of the applicant of the object, in short an applicant message, with a no-loss notice has arrived 304, 320. An applicant message with a no-loss notice causes a return to the observation state.

FIG. 8 shows the following flow chart detail. In the observation state, the system computer examines 300 again and again whether a tracking message with a loss inquiry has arrived after at least 600 S without such a tracking message and, if so, whether 1200 S have passed already since the last applicant message with a no-loss notice had arrived 304, 320. As soon as everything applies, it dispatches a system message with a loss inquiry to a data processing device of the applicant 310 and subsequently swaps into the investigation state.

Should the tracking device be transported during an extended period of time, the system computer is prevented from bothering the applicant with repeat loss inquiries every 1200 S, and from swapping back and forth between observation state and investigation state. As can be seen in FIG. 6, after receiving a system message with a no-loss notice, the tracking device until further notice will not send tracking messages with a loss inquiry.

The system computer in other examples is capable of dispatching the loss inquiry in consequence of a delivery of a tracking message with a transport notice, or in consequence of a delivery of a message with a transport notice from a wireless communication module of the communication network. Alternatively, the system computer is capable of dispatching the loss inquiry in consequence of a delivery of a tracking message with a position statement outside a usual area or outside an area that has been fixed for the object by the applicant, or in consequence of a delivery of a message with such a position statement from a wireless communication module of the communication network.

The loss inquiry, for example, is received as a text message, also called short message service or SMS, on the mobile telephone of the applicant, or as a text message on his Facebook website on the Internet. Advantageously, the system computer, or the mobile data processing device, is capable of building an operating interface for the applicant of the object on the Internet.

Both in the observation state and in the investigation state, the system computer examines regularly whether an applicant message with a loss notice is present 301, 318. Such a message would lead to it dispatching a system message with a loss notice to the relevant tracking device 311, 319. If not already there, it swaps from the observation state into the investigation state next.

In the observation state as well as in the investigation state, the system computer examines whether an applicant message on a replacement person has arrived 302, 316. The applicant, for example, might intend to go on vacation and therefore declare his apartment caretaker as a replacement person during two weeks. Following this, during those two weeks, the system computer dispatches the system messages for the applicant to the data processing device of the caretaker instead, and can, in return, effectively forward to the data processing device of the caretaker the applicant messages on a loss of the object and so on 303, 317. An exception, however, is any system message about the contractual relation with the applicant, such as a payment reminder, which is postponed as much as possible.

In the observation state as well as in the investigation state, the system computer examines whether an applicant message with a no-loss notice is present 304, 320. This leads to it dispatching a system message with a no-loss notice to the related tracking device 305 and, if not already there, swapping from the investigation state into the observation state. The no-loss notice thus overrules a loss inquiry and effectively cancels a loss notice.

In the observation state, the system computer also examines often whether an applicant message with an at-rest notice has arrived 306. If so, it dispatches a system message with an at-rest notice to the tracking device 307. As a consequence, the tracking device leaves the state of restraint for the surveillance state. Typically, an applicant message with a no-loss notice has already come. The latter message does not mean that the object is already resting safely, but only that it would be in safe hands. In order not to let the applicant forget delivering his message with an at-rest notice, the system computer next dispatches to the applicant a system message with an at-rest inquiry once every 3600 S 309. For this, it first examines 308 that after the system message with the no-loss notice 305, no applicant message with an at-rest notice or new applicant message with a loss notice has arrived, if indirectly 307, 311. Secondly, it examines 308 that, within the last 3600 S, no new tracking message with a transport notice 103, 111, 115, 119 has arrived and no system message with an at-rest inquiry 309 has been dispatched.

Advantageously, the system computer is capable of dispatching a system message with an at-rest inquiry 309 to a data processing device of the applicant on the basis of an assessment at least of tracking messages without a transport notice. After the applicant has confirmed to the system that the object until further notice is at rest, the tracking device gets the system message and surveils whether transport occurs.

In the investigation state, the system computer on the one hand examines 312 whether it has received tracking messages via a wireless communication module of a data processing device that is allocated to the object, or tracking messages in another way that inform of the detection by the wireless communication module of the tracking device of messages from such a data processing device. It can thus decide to dispatch a system message with an attendance notice to a data processing device of the applicant 313 and so inform him that the tracking device is attended by said data processing device. On the other hand, it examines 312 that no such system message with an attendance notice 313 was dispatched in the last 3600 S. One should not burden the applicant with an unnecessary amount of system messages.

In contrast, it may also be important for the applicant to know of a longer interruption of this attendance. That may be an indication that the object is lost. Therefore, the system computer also examines often whether after the system message with the attendance notice 313, the data processing device that is allocated to the object has been out of reach for more than 600 S 314, which would lead to a system message with an attendance withdrawal notice to a data processing device of the applicant 315, and this only once 314 in order to spare him annoyance, as the system computer continues to examine.

In an alternative embodiment, in the investigation state, the system computer at the onset and at the end of a period with suppositions of large transports sends a corresponding system message to the data processing device of the applicant.

In the investigation state, the system computer examines whether tracking messages according to BLE have arrived in the last 60 S roughly in a usual cycle frequency of once per 0.5 S, once per 2 S or once per 10 S. This is a test for having a durable connection between the tracking device and a wireless communication module of the communication network. If such is the case, the system computer dispatches a system message with a durable connection notice back to the wireless communication module of the tracking device 322.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:
1. A tracking device comprising:
   at least an electrical power source, with a processor, a memory and a wireless
   communication module that sends tracking messages and receives messages,
   whereby the tracking device at least temporarily increases or decreases the mean power over time of the wireless communication module,
   whereby the tracking device comprises a motion detector,
   whereby the tracking device is decreases the mean power over time of the wireless communication module by temporarily ending the capability of the wireless communication module to receive messages following a period after sending a tracking message,
   whereby the tracking device is increases or decreases the mean power over time of the wireless commu- nication module in consequence of a transport supposition on the basis of an assessment of at least the motion signal, and whereby the tracking device decreases the mean power over time when it infers a durable connection regarding a data processing device in which an application program is active that is conversant with the tracking device.

2. A tracking device according to claim 1, whereby the motion detector comprises an acceleration sensor.

3. A tracking device according to claim 1, whereby the tracking device includes an application program for maintaining a list of mobile or non-mobile data processing devices in the memory, and whereby the tracking device decreases the mean power over time of the wireless communication module on the basis of an assessment of the detection by its wireless communication module of a message or messages from a wireless communication module of a data processing device in the list.

4. A tracking device according to claim 1, whereby the motion detector comprises an acceleration sensor, and whereby the tracking device is determines a transport supposition at least on the basis of the rate of occurrence and the nature of accelerations.

5. A tracking device according to claim 1, whereby the motion detector comprises a GPS module.

6. A tracking device according to claim 1, whereby the motion detector comprises a wireless communication module that can receive messages from wireless communication modules of wireless network communication installations, and whereby the tracking device determines a transport supposition on the basis of an assessment of at least suitable statements in the messages.

7. A tracking device according to claim 1, whereby the tracking device increases or decreases the mean power over time of the wireless communication module on the basis of an assessment of the receipt by its wireless communication module of a message or messages from a wireless communication module of a data processing device in which an application program is active that is conversant with the tracking device.

8. A tracking device according to claim 1, whereby the tracking device comprises a radiation sensor, and whereby the tracking device increases or decreases the mean power over time of the wireless communication module on the basis of an assessment of at least the radiation signal regarding the diurnal cycle or regarding quicker intensity changes.

9. A tracking device according to claim 1, whereby the tracking device increases or decreases the mean power over time by increasing, or respectively decreasing the mean sending power over the course of a tracking message.

10. A tracking device comprising:

at least an electrical power source, with a processor, with a memory and with a wireless communication module that sends tracking messages and also receives messages, whereby the tracking device at least temporarily increases or decreases the mean power over time of the wireless communication module, whereby the tracking device increases or decreases the mean power over time of the wireless communication module on the basis of an assessment of at least the mean rate of occurrence of wireless communication modules from which its wireless communication module detects messages, and whereby the tracking device decreases the mean power over time when it infers a durable connection regarding a data processing device in which an application program is active that is conversant with the tracking device.

11. A tracking device according to claim 10, whereby the tracking device comprises a radiation sensor, and whereby the tracking device is increases or decreases the mean power over time of the wireless communication module on the basis of an assessment of at least the radiation signal regarding the diurnal cycle or regarding quicker intensity changes.

12. A tracking device according to claim 10, whereby the tracking device increases or decreases the mean power over time by increasing, or respectively decreasing the mean sending power over the course of a tracking message.

* * * * *